US012368598B2

(12) United States Patent
Boussard et al.

(10) Patent No.: US 12,368,598 B2
(45) Date of Patent: Jul. 22, 2025

(54) CONSENSUS AUTOMATION

(71) Applicant: Nokia Technologies Oy, Espoo (FI)

(72) Inventors: Mathieu Boussard, Massy (FR); Serge Papillon, Massy (FR)

(73) Assignee: Nokia Technologies Oy, Espoo (FI)

( * ) Notice: Subject to any disclaimer, the term of this patent is extended or adjusted under 35 U.S.C. 154(b) by 302 days.

(21) Appl. No.: 18/247,812

(22) PCT Filed: Aug. 17, 2021

(86) PCT No.: PCT/EP2021/072798
§ 371 (c)(1),
(2) Date: Apr. 4, 2023

(87) PCT Pub. No.: WO2022/073675
PCT Pub. Date: Apr. 14, 2022

(65) Prior Publication Data
US 2023/0421382 A1    Dec. 28, 2023

(30) Foreign Application Priority Data
Oct. 9, 2020 (FI) .................................... 20205992

(51) Int. Cl.
*H04L 9/32* (2006.01)
*H04L 9/00* (2022.01)
(52) U.S. Cl.
CPC .................... *H04L 9/3242* (2013.01)
(58) Field of Classification Search
CPC ....... H04L 9/3242; H04L 9/3247; H04L 9/50; H04L 9/3239; H04L 2209/80
See application file for complete search history.

(56) References Cited

U.S. PATENT DOCUMENTS 10,299,128 B1 *  5/2019 Suthar ............... H04M 15/8016
10,928,803 B2 *  2/2021 Biernat .................. H04L 63/12
(Continued)

FOREIGN PATENT DOCUMENTS

CN    111736963 A  * 10/2020    ............ G06F 9/466
EP      3547231 A1  * 10/2019    ......... G06F 16/2379
WO  2019/161936 A1    8/2019

OTHER PUBLICATIONS

European Application No. 19179332.2, "Blockchain Based Network Slicing", filed on Jun. 11, 2019, 23 pages.
Backman et al., "Blockchain Network Slice Broker in 5G: Slice Leasing in Factory of the Future Use Case", Internet of Things Business Models, Users, and Networks, Nov. 23-24, 2017, 8 pages.
Ning-Dai et al., "Blockchain for Internet of Things: A Survey", arXiv, Feb. 7, 2020, pp. 1-19.
(Continued)

*Primary Examiner* — Alina A Boutah
(74) *Attorney, Agent, or Firm* — Nokia Technologies Oy

(57) ABSTRACT

A method comprising: retrieving update rules stored in a distributed ledger from the distributed ledger; checking whether or not a received initial transaction fulfills all the retrieved update rules; creating a block comprising the initial transaction if the initial transaction fulfills all the retrieved update rules; broadcasting the block into a network of the distributed ledger, wherein the initial transaction requests to modify a content of a slice and/or an intent of the slice; if the initial transaction requests to modify the content of the slice, at least one of the update rules constrains the content of the slice or the modifying of the content of the slice, and if the initial transaction requests to modify the intent of the slice, at least one of the update rules constrains the intent of the slice or the modifying of the intent of the slice.

17 Claims, 9 Drawing Sheets

(56) References Cited

U.S. PATENT DOCUMENTS

| | | |
|---|---|---|
| 10,986,500 B1* | 4/2021 | Marquardt ............... H04L 63/12 |
| 2019/0028276 A1 | 1/2019 | Pierce et al. |
| 2019/0228086 A1* | 7/2019 | Bordens ................ G06F 16/219 |
| 2019/0340170 A1 | 11/2019 | Pierce et al. |
| 2020/0007513 A1* | 1/2020 | Gleichauf ............. G06F 21/105 |
| 2020/0029250 A1 | 1/2020 | Ibek et al. |
| 2020/0057860 A1* | 2/2020 | Patil .................... G06F 21/6209 |
| 2020/0059487 A1* | 2/2020 | Malik ................... H04L 9/0643 |
| 2020/0089671 A1 | 3/2020 | Padmanabhan et al. |
| 2020/0159851 A1 | 5/2020 | Madhavan |
| 2020/0195441 A1* | 6/2020 | Suen ................... G06F 16/1805 |
| 2020/0195495 A1* | 6/2020 | Parker ..................... H04L 41/40 |
| 2020/0367129 A1* | 11/2020 | Raheem ............. H04L 41/0896 |
| 2021/0011710 A1* | 1/2021 | Taivalsaari ................ G06F 8/65 |
| 2021/0176038 A1* | 6/2021 | Bortnikov ............. H04L 9/0894 |
| 2022/0166667 A1* | 5/2022 | Celozzi ................. H04W 48/14 |

OTHER PUBLICATIONS

Office action received for corresponding Finnish Patent Applicaion No. 20205992, dated Jan. 27, 2021, 12 pages.
Tahir et al., "A Review on Application of Blockchain in 5G and Beyond Networks: Taxonomy, Field-Trials, Challenges and Opportunities", IEEE Access, vol. 8, Jun. 17, 2020, pp. 115876-115904.
Office action received for corresponding Finnish U.S. Appl. No. 20/205,992, dated May 18, 2021, 9 pages.
International Search Report and Written Opinion received for corresponding Patent Cooperation Treaty Application No. PCT/EP2021/072798, dated Dec. 13, 2021, 13 pages.
Office Action received for corresponding European Patent Application No. 21773472.2, dated Apr. 12, 2024, 4 pages.

* cited by examiner

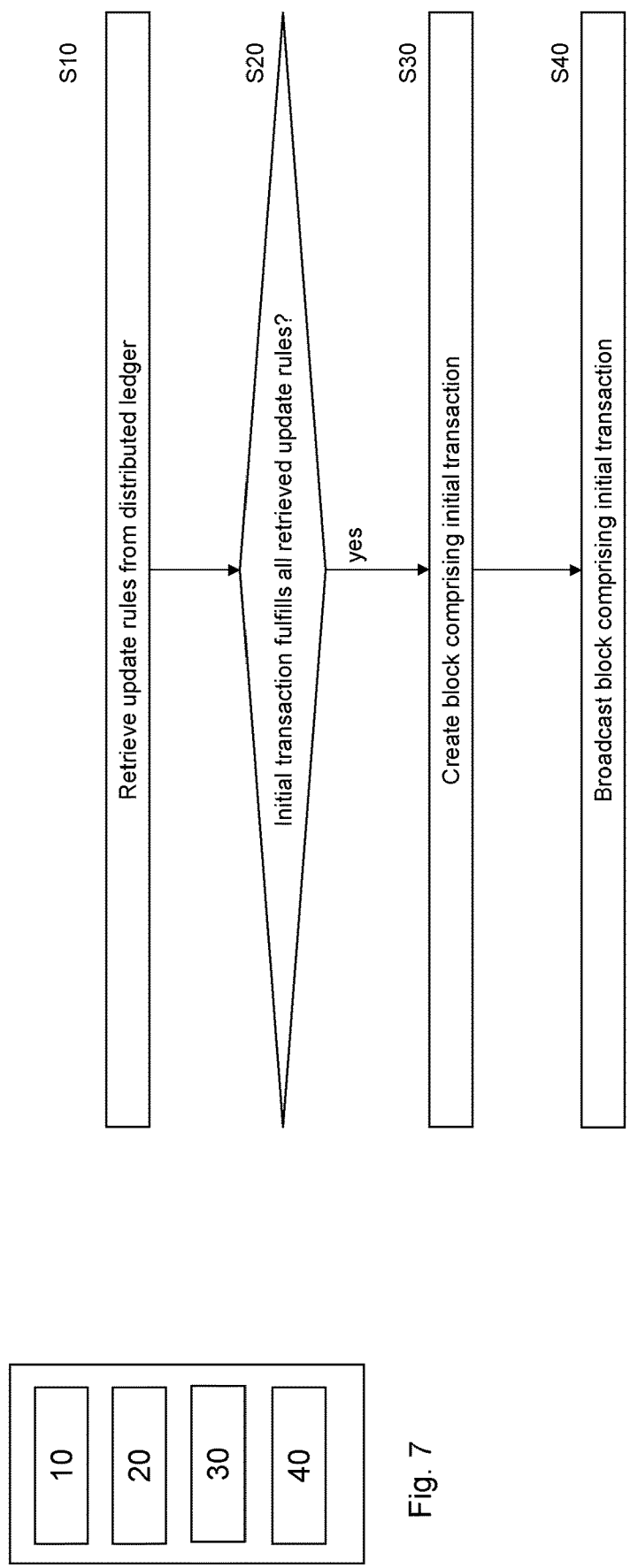

CONSENSUS AUTOMATION

RELATED APPLICATION

This application was originally filed as PCT Application No. PCT/EP2021/072798, filed on Aug. 17, 2021, which claims priority from Finnish Application No. 20205992, filed on Oct. 9, 2020, each of which is incorporated herein by reference in its entirety.

FIELD OF THE INVENTION

The present disclosure relates to consensus automation in the context of a distributed ledger.
Abbreviations
  3GPP $3^{rd}$ Generation Partnership Project
  3G/4G/5G $3^{rd}/4^{th}/5^{th}$ Generation
  BN Blockchain Network
  HMAC Keyed-Hash Message Authentication Code
  IP Internet Protocol
  RBAC Role Based Access Control

BACKGROUND OF THE INVENTION

Network slicing is a specific form of virtualization that allows multiple logical networks to run simultaneously, for example on top of a shared physical network infrastructure. The key benefit of the network slicing concept is that it provides an end-to-end virtual network encompassing not just networking but compute and storage functions, too.

The principle of network slicing provides the ability to create different virtual networks over which different traffic flows can travel isolated from each other. For example, a network slice can include a collection of logical network functions that support a communication service requirement of a particular network service. Accordingly, different network slices can support different services and/or different types of communication devices. Connectivity between computing resources can be allocated so that traffic of one network slice can be isolated from that of another. Isolation can be based on one or more of network operator, service, application, user, user equipment, level of subscription service, and so on.

Network slice operation may be transparent or visible to end users or communication devices. The communication devices may be configured to discover what network slices are being provided by the operator (e.g., in the devices' current location and/or radio access network). A radio access network may belong to various network slices. In such a situation, knowledge about the network slices may enable a communication device to select an appropriate radio access network for a target network slice.

Innovative decentralized data storage solutions, such as blockchains, enable to provide provenance and also to avoid the need to rely on third parties to regulate information and data systems. In addition, blockchain platforms can host "smart contracts" which may replace established methods based on human witnesses by logical software-implemented protocols.

"Smart contracts" may be defined as computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

A blockchain network BN relies on a blockchain architecture that is a replicated computing architecture where every network node of the BN executes and records the same transactions in the same order. Typically, only one transaction at a time is globally accepted and all those transactions create the blockchain data-set which is kept replicated across the whole network. This is achieved without the need of a central authority since each and every transaction (as well as its order within the global set of transactions) needs to be accepted and broadcasted by a fraction of the network (each blockchain implementation has its own fraction's size). The blockchains can work in different ways, as well as in different scales. A blockchain is an example of a distributed ledger. In general, distributed ledgers do not require a chain of blocks. Furthermore, distributed ledgers do not need proof of work.

The nodes of a blockchain network may comprise corporate, authority, and/or user devices, such as a server, a desktop/tablet/laptop computer, smartphone or other suitable electronic device. The system may comprise an administrator or management node, a relay or other kind of intermediate device for connecting a node to further networks or services, such as another distributed or centralized computing system or a cloud service. The nodes are mutually addressable in a suitable way, for example, they may be connected to an internet protocol, IP, network. Messages released into the IP network with a recipient address are routed by the network to the recipient node identified by the recipient address. IP is not the only suitable networking technology. Other peer-to-peer networking models are also suitable.

The blockchain state information shared by the nodes may store all the transactions and history carried out in the network. The blockchain state information is stored in or as a blockchain ledger. Each node comprises the ledger whose content is in sync with ledgers stored at other nodes of the network. The nodes may validate and commit transactions in order to reach consensus. Each node may have its own copy of the ledger and may be permission-controlled, such that participants see only appropriate transactions. Application of blockchain technology and the ledger enable a way to track the unique history of transactions by the individual nodes in the network.

A blockchain begins with the creation of a 'genesis' block. Each subsequent block then includes a hash of the previous block in the block chain. This has two effects: 1.) modifying an existing block would also require regenerating each block after it, which is highly impractical from a computational standpoint and prevents malicious changes and 2.) the hashing mechanism provides an ordering to the blocks that traces all the way back to the genesis block, allowing devices to track changes in the system. The actual data content of the blocks can also vary. For example, the data in the blocks typically include a listing of exchanges/transactions and can include any information.

A block of the blockchain may comprise at least header fields and a set of transactions that forms an actual transaction data of the block. The transactions may also comprise different kinds of transactions, as the block chain need not be dedicated to one single type of transaction.

Blockchain systems typically implement a peer-to-peer system based on some combination of encryption, consensus algorithms, and proof-of-X, where X is some aspect that is difficult to consolidate across the network, such as proof-of-work, proof-of-stake, proof-of-storage, etc. Typically, those actors on a network having proof-of-X arrive at a consensus regarding the validation of peer-to-peer transactions. Some private blockchains do not implement proof-of-X consensus, e.g., where the computing hardware implementing the blockchain is controlled by trusted parties. Chained cryptographic operations tie a sequence of such transactions into a chain that once validated, is typically prohibitively computationally expensive to falsify.

The blockchain network can be public or private. A public blockchain is a blockchain that anyone can read, send transactions and expect to see them included if they are valid, and anyone can participate in a consensus process for determining what blocks get added to the chain. Different kinds of private blockchain may be distinguished. A fully private blockchain is a blockchain where write permissions are kept to one organization. Read permissions may be public or restricted to certain participants. A consortium blockchain is a blockchain where a consensus process is controlled by a pre-selected set of nodes, for example, a consortium of 15 financial institutions, each of which operates a node and of which 10 must sign every block in order for the block to be valid. The right to read the blockchain may be public or restricted to the participants. A semi-private blockchain is run by a single company who grants access to any user who qualifies, and it typically targets business-to-business users. Examples of semi-private blockchains could include ones for government entities for record-keeping, land titles, public records, etc.

FIG. 1 shows the principle of a blockchain (distributed ledger). Each peer (participant) holds a copy of the blockchain. The blockchain comprises blocks, and each block records one or more transactions. The integrity of the blockchain is ensured by a consensus among the peers, which is achieved by the blockchain protocol. In particular, if a peer (in FIG. 1: Peer 1) verifies a transaction (initial transaction), it creates a block, appends the created block on the blockchain and distributes it into the network of the distributed ledger (BN). The other peers may verify the new block and inform the other peers that they verified the new block by a verification transaction. Another one of the peers (which one is determined by the distributed ledger protocol) collects the verification transactions. If it collected sufficient verification transactions, it creates a new block, appends it to the blockchain, and distributes it into the network of the distributed ledger. Hence, all the peers are informed that the new block and, thus, the initial transaction is verified.

In general, in a blockchain, every peer may broadcast a new block at a time. If several peers issue a new block, the blockchain protocol decides by a branching mechanism (the longest chain wins), which blocks are valid for the BN. If a peer receives a transaction, it checks whether the transaction satisfies some applicative rules before it may create a new block (e.g. checking the money exchange does not exceed wallet content in a crypto currency application example), as well as security checks (e.g. signature, permissions if applicable).

A "slice" is a set of resources shared by plural participants. The content of the slice are the resources. The set of resources comprised in the slice may change dynamically. I.e., resources may be added or removed, and the resources may be reconfigured.

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to:
  retrieve update rules stored in a distributed ledger from the distributed ledger; check whether or not a received initial transaction fulfills all the retrieved update rules; create a block comprising the initial transaction if the initial transaction fulfills all the retrieved update rules; broadcast the block into a network of the distributed ledger, wherein,
  the initial transaction requests to modify a content of a slice and/or an intent of the slice;
  if the initial transaction requests to modify the content of the slice, at least one of the update rules constrains the content of the slice or the modifying of the content of the slice, and
  if the initial transaction requests to modify the intent of the slice, at least one of the update rules constrains the intent of the slice or the modifying of the intent of the slice.

According to a second aspect of the invention, there is provided an apparatus comprising: one or more processors, and memory storing instructions that, when executed by the one or more processors, cause the apparatus to:
  check whether or not a distributed ledger comprises an update validation rule relevant for an initial transaction comprised in a block received by a participant of the distributed ledger from a network of the distributed ledger;
  determine whether or not the participant accepts the initial transaction if the distributed ledger comprises the update validation rule;
  create a validation part transaction comprising the result of the determining if the distributed ledger comprises the update validation rule and the participant accepts the initial transaction; broadcast the validation part transaction into the network of the distributed ledger, wherein the initial transaction requests to modify a content and/or an intent of a slice;
  the update validation rule defines a condition for validating the initial transaction based on acceptance or non-acceptance of the initial transaction According to a third aspect of the invention, there is provided an apparatus comprising: one or more processors, and memory storing instructions that, when executed by the one or more processors, cause the apparatus to:
  check whether or not a distributed ledger comprises one or more update validation rules relevant for an initial transaction comprised in a block received by a participant of the distributed ledger from a network of the distributed ledger;
  retrieve the one or more relevant update validation rules stored in the distributed ledger;
  determine, based on one or more validation part transactions referencing the initial transaction received in one or more blocks from the network of the distributed ledger, whether or not all the retrieved update validation rules are fulfilled for the initial transaction; create a global validation transaction comprising the received validation part transactions if all the retrieved update validation rules are fulfilled for the initial transaction; broadcast the global validation transaction into the network of the distributed ledger, wherein the initial transaction requests to modify a content of a slice and/or an intent of the slice; each of the update validation rules defines at least one of the following conditions for validating the initial transaction:

not more than a respective first number of received validation part transactions indicates that the initial transaction is not accepted by a respective participant of the distributed ledger; or at least a respective second number of received validation part transactions indicates that the initial transaction is accepted by a respective participant of the distributed ledger.

According to a fourth aspect of the invention, there is provided a method, comprising: retrieving update rules stored in a distributed ledger from the distributed ledger; checking whether or not a received initial transaction fulfills all the retrieved update rules; creating a block comprising the initial transaction if the initial transaction fulfills all the retrieved update rules;

broadcasting the block into a network of the distributed ledger, wherein, the initial transaction requests to modify a content of a slice and/or an intent of the slice;

if the initial transaction requests to modify the content of the slice, at least one of the update rules constrains the content of the slice or the modifying of the content of the slice, and if the initial transaction requests to modify the intent of the slice, at least one of the update rules constrains the intent of the slice or the modifying of the intent of the slice.

According to a fifth aspect of the invention, there is provided a method, comprising: checking whether or not a distributed ledger comprises an update validation rule relevant for an initial transaction comprised in a block received by a participant of the distributed ledger from a network of the distributed ledger;

determining whether or not the participant accepts the initial transaction if the distributed ledger comprises the update validation rule;

creating a validation part transaction comprising the result of the determining if the distributed ledger comprises the update validation rule and the participant accepts the initial transaction;

broadcasting the validation part transaction into the network of the distributed ledger, wherein the initial transaction requests to modify a content and/or an intent of a slice;

the update validation rule defines a condition for validating the initial transaction based on acceptance or non-acceptance of the initial transaction by at least one of the participants of the distributed ledger.

According to a sixth aspect of the invention, there is provided a method, comprising: checking whether or not a distributed ledger comprises one or more update validation rules relevant for an initial transaction comprised in a block received by a participant of the distributed ledger from a network of the distributed ledger;

retrieving the one or more relevant update validation rules stored in the distributed ledger;

determining, based on one or more validation part transactions referencing the initial transaction received in one or more blocks from the network of the distributed ledger, whether or not all the retrieved update validation rules are fulfilled for the initial transaction; creating a global validation transaction comprising the received validation part transactions if all the retrieved update validation rules are fulfilled for the initial transaction;

broadcasting the global validation transaction into the network of the distributed ledger, wherein the initial transaction requests to modify a content of a slice and/or an intent of the slice; each of the update validation rules defines at least one of the following conditions for validating the initial transaction:

not more than a respective first number of received validation part transactions indicates that the initial transaction is not accepted by a respective participant of the distributed ledger; or at least a respective second number of received validation part transactions indicates that the initial transaction is accepted by a respective participant of the distributed ledger.

Each of the methods of the fourth to sixth aspects may be a method of consensus automation.

According to a seventh aspect of the invention, there is provided an apparatus, comprising: means for retrieving update rules stored in a distributed ledger from the distributed ledger; means for checking whether or not a received initial transaction fulfills all the retrieved update rules:

means for creating a block comprising the initial transaction if the initial transaction fulfills all the retrieved update rules;

means for broadcasting the block into a network of the distributed ledger, wherein, the initial transaction requests to modify a content of a slice and/or an intent of the slice;

if the initial transaction requests to modify the content of the slice, at least one of the update rules constrains the content of the slice or the modifying of the content of the slice, and if the initial transaction requests to modify the intent of the slice, at least one of the update rules constrains the intent of the slice or the modifying of the intent of the slice.

According to an eighth aspect of the invention, there is provided an apparatus, comprising: means for checking whether or not a distributed ledger comprises an update validation rule relevant for an initial transaction comprised in a block received by a participant of the distributed ledger from a network of the distributed ledger;

means for determining whether or not the participant accepts the initial transaction if the distributed ledger comprises the update validation rule;

means for creating a validation part transaction comprising the result of the determining if the distributed ledger comprises the update validation rule and the participant accepts the initial transaction;

means for broadcasting the validation part transaction into the network of the distributed ledger, wherein the initial transaction requests to modify a content and/or an intent of a slice;

the update validation rule defines a condition for validating the initial transaction based on acceptance or non-acceptance of the initial transaction by at least one of the participants of the distributed ledger.

According to a ninth aspect of the invention, there is provided an apparatus, comprising: means for checking whether or not a distributed ledger comprises one or more update validation rules relevant for an initial transaction comprised in a block received by a participant of the distributed ledger from a network of the distributed ledger; means for retrieving the one or more relevant update validation rules stored in the distributed ledger;

means for determining, based on one or more validation part transactions referencing the initial transaction received in one or more blocks from the network of the distributed ledger, whether or not all the retrieved update validation rules are fulfilled for the initial transaction; means for creating a global validation transaction comprising the received validation part transactions if all the retrieved update validation rules are fulfilled for the initial transaction; means for broadcasting the global validation transaction into the network of the distributed ledger, wherein the initial transaction requests to modify a content of a slice and/or an intent of the slice; each of the update validation rules defines at least one of the following conditions for validating the initial transaction:

not more than a respective first number of received validation part transactions indicates that the initial transaction is not accepted by a respective participant of the distributed ledger; or at least a respective second number of received validation part transactions indicates that the initial transaction is accepted by a respective participant of the distributed ledger.

According to a tenth aspect of the invention, there is provided a computer readable medium comprising program instructions stored thereon for causing an apparatus to perform at least the following:

retrieving update rules stored in a distributed ledger from the distributed ledger; checking whether or not a received initial transaction fulfills all the retrieved update rules; creating a block comprising the initial transaction if the initial transaction fulfills all the retrieved update rules;

broadcasting the block into a network of the distributed ledger, wherein, the initial transaction requests to modify a content of a slice and/or an intent of the slice;

if the initial transaction requests to modify the content of the slice, at least one of the update rules constrains the content of the slice or the modifying of the content of the slice, and if the initial transaction requests to modify the intent of the slice, at least one of the update rules constrains the intent of the slice or the modifying of the intent of the slice.

According to an eleventh aspect of the invention, there is provided a computer readable medium comprising program instructions stored thereon for causing an apparatus to perform at least the following:

checking whether or not a distributed ledger comprises an update validation rule relevant for an initial transaction comprised in a block received by a participant of the distributed ledger from a network of the distributed ledger;

determining whether or not the participant accepts the initial transaction if the distributed ledger comprises the update validation rule;

creating a validation part transaction comprising the result of the determining if the distributed ledger comprises the update validation rule and the participant accepts the initial transaction;

broadcasting the validation part transaction into the network of the distributed ledger, wherein the initial transaction requests to modify a content and/or an intent of a slice;

the update validation rule defines a condition for validating the initial transaction based on acceptance or non-acceptance of the initial transaction by at least one of the participants of the distributed ledger.

According to a twelfth aspect of the invention, there is provided a computer readable medium comprising program instructions stored thereon for causing an apparatus to perform at least the following:

checking whether or not a distributed ledger comprises one or more update validation rules relevant for an initial transaction comprised in a block received by a participant of the distributed ledger from a network of the distributed ledger;

retrieving the one or more relevant update validation rules stored in the distributed ledger;

determining, based on one or more validation part transactions referencing the initial transaction received in one or more blocks from the network of the distributed ledger, whether or not all the retrieved update validation rules are fulfilled for the initial transaction; creating a global validation transaction comprising the received validation part transactions if all the retrieved update validation rules are fulfilled for the initial transaction;

broadcasting the global validation transaction into the network of the distributed ledger, wherein the initial transaction requests to modify a content of a slice and/or an intent of the slice; each of the update validation rules defines at least one of the following conditions for validating the initial transaction:

not more than a respective first number of received validation part transactions indicates that the initial transaction is not accepted by a respective participant of the distributed ledger; or at least a respective second number of received validation part transactions indicates that the initial transaction is accepted by a respective participant of the distributed ledger.

According to some embodiments of the invention, at least one of the following advantages may be achieved:

Consensus of the participants to the content and/or intent of the slice (set of shared resources) is always ensured;

The transaction history is auditable; or

Human interaction may be minimized or even avoided.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 7 shows an apparatus according to an example embodiment of the invention;

FIG. 8 shows a method according to an example embodiment of the invention;

DETAILED DESCRIPTION OF CERTAIN EMBODIMENTS

Figure 1:
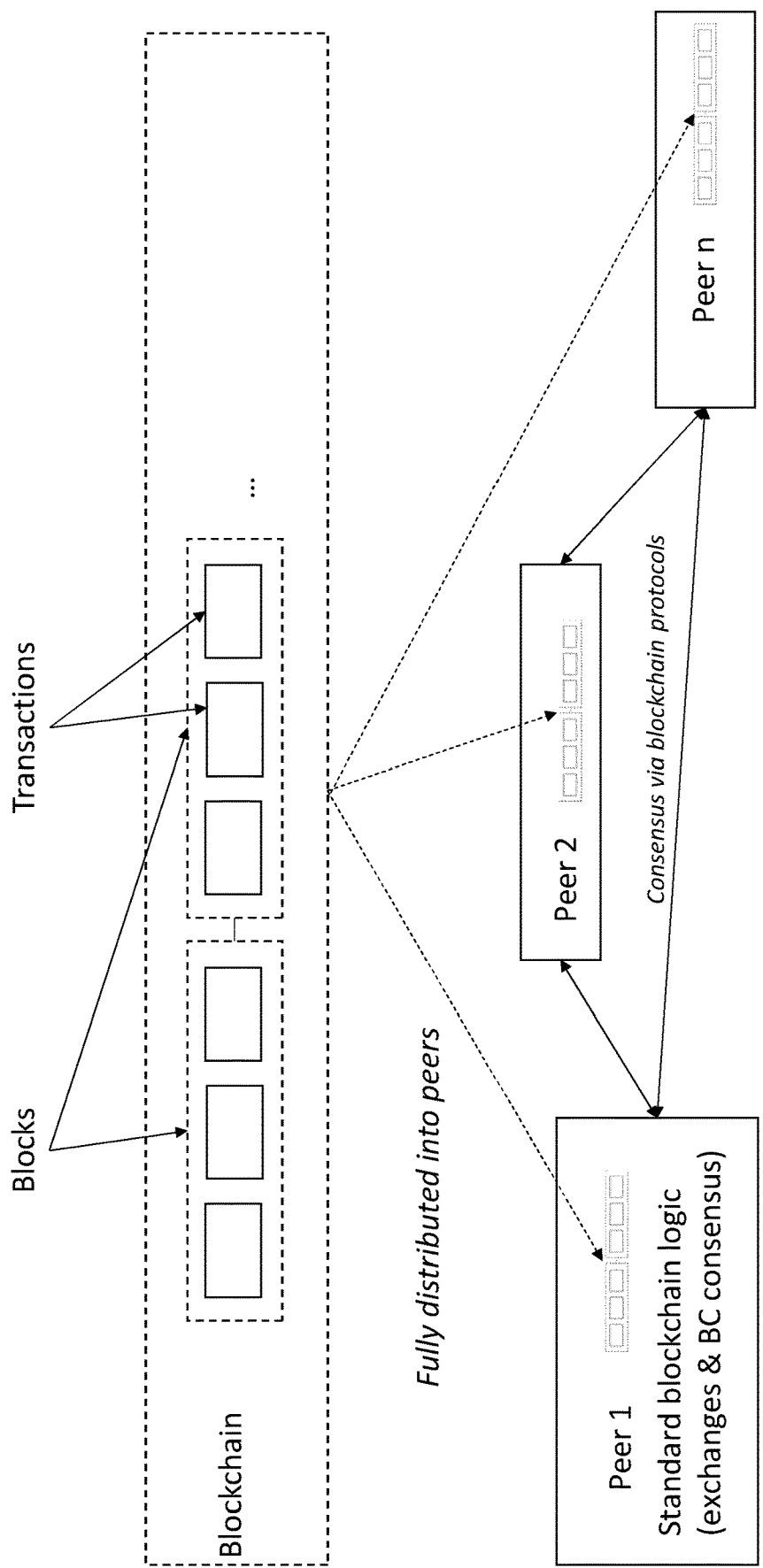
FIG. 1 shows the components of a distributed ledger (here: a blockchain network)

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The expression "at least one of A or B" means A, or B, or both A and B.

In some cases, different participants each having their own network domain may share a common, cross-domain network slice onto which they connect their assets from their own network domain to support collaboration. These multiple domains may need to contribute resources from their network to a common slice, e.g. in multi-location/multi-tenant collaboration settings although there might be only a limited trust relationship.

An illustrative scenario is e.g. an industrial setting such as a nuclear power plant. During maintenance phase, a large number of participants (sub-contractors, plant operator) may need to share resources from different network domains (e.g. 5G wireless slices owned by sub-contractors A & B, a sub-part/slice of the plant operator's network etc). In doing so each participant agrees to some risk, so it is of paramount importance that a shared understanding of what can/what should not be in the resulting shared slice is maintained. That understanding may be called the intent of the slice.

That is, the composition of such a slice is dictated by the slice intent. The slice intent is shared by all participants. It may be considered as the result of a consensus between all the participants. Indeed, each participant takes a risk by connecting its assets with others', so each evolution of the content of the slice, resulting from automated or manual updates, needs to be assessed against the current intent of the slice (the original intent or an updated intent, if any).

Advantageously, a network slice is described by its intent (who are the participants, what are the rules that govern its content), and a content (what is the current state of the slice in terms of participating devices and their links (set of resources) from each domain).

The intent is shared by all the participants of such a slice. Thus, a consensus is guaranteed between all participants' understood intent for that slice at all-time (slice creation time and subsequent updates), and the system is rendered auditable for later reference in case a participant suspects the intent was breached.

Intent may be generic to leave the way for automation via rules, e.g. "all sensing devices from category X belonging to participant A are acceptable", to enable dynamic updates of the content of the slice (its current state).

An intent update may comprise adding and/or removing and/or changing slice verification rules, and/or adding and/or removing participating network domains. A content update may comprise adding and/or removing and/or modifying resources and/or participating communication devices in the network domains.

When providing a shared collaborative environment to multiple tenants, a challenge is to maintain a state agreeable by all participants, i.e. that any modification performed is acceptable to all participants. The composition of such a "slice" is dictated by the commonly agreed "slice intent", that can be considered as the result of a consensus between the participants. In a networking context, as each participant takes a risk by connecting its assets with others', each evolution of the content of the slice, resulting from automated or manual updates, needs to be assessed against the jointly agreed current intent.

A problem may arise when one of the participants wants to modify the content of the shared slice (e.g. by adding a resource to it) through a content update request: other participants should be assured that the addition of this new resource does not break their understanding of what the slice intent is. If the intent is too strict and needs revision to allow the modification of the content (through an intent update), a way to reach a consensual understanding of the new intent before enforcing it across domains is required as well. An objective of the invention is to automate as much as possible such processes to limit human intervention at each evolution of the slice definition (intent/content), while guaranteeing consensus between participants at all times (slice creation time and subsequent updates). Another objective is to render the system auditable for later reference (e.g. in case a participant suspects the intent was breached).

One very difficult problem arises when dealing with concurrent modification requests that are incompatible. Let's suppose that, for security reasons, an intent of a slice prevents to have simultaneously a 'typeA' resource include not only cases where the rules are modified unanimously but also cases where a minority of the participants does not agree to the modification of the rule, provided that a corresponding intent rule was originally agreed on unanimously. In any case, both the original rule and the modified rule are in the distributed ledger, e.g. for auditing purposes.

Optionally, after the enforcement, a transaction that expresses the enforcement may be emitted to the ledger.

Some example embodiments of the invention rely on the use of a distributed ledger shared among the participants participating to the considered slice. Blockchain systems (permissioned and permissionless) are implementing such a ledger. In a blockchain system, the requests are issued under the form of "transaction". They are forwarded to all participants (or their peers, respectively). Each participant (peer) verifies the validity of the transaction from a security point of view (signature verification) and from a functional point of view (in the case of crypto money, check of sufficient balance to perform the transaction, or in the case of smart contract, running the smart contract and checking the result). If the transaction is sound the participant (its peer) may integrate the transaction in a block of one or several transactions and send the block into the network of the distributed ledger (i.e. to the other participants (peers)). There are several ways for deciding which peer is the one to produce the next block. In permissioned blockchains, the order may be pre-established, while in the case of permissionless blockchains the order is randomized (either using a crypto game like a proof of work, or other means). The decision mechanism is provided by the protocol of the distributed ledger (e.g. blockchain). Some example embodiments of this invention rely on the property of distributed ledgers that eventually a validated block of validated transactions will be produced and accepted by all peers.

In some example embodiments of this invention, the validation phase needs to verify that the transaction respects the intent of a slice. If the intent includes the participant list, authentication methods may be used (using random numbers and signatures—using asymmetric keys—for instance). The other part of the rules may be verified using logic engines.

According to some example embodiments of the invention, the rules describing the intent (i.e.: the intent rules) are stored in the same way as the slice modification request transaction: in the ledger. The intent rules themselves may be subject to modification requests.

A rule may be composed of three parts:

Content update: expresses the technical constraints the slice content (and/or modifications of the slice content) should respect. It is a logical expression that may be based on verifiable information such as characteristics of the device that requests to be plugged in the slice (such as owner, manufacturer, manager, type, bandwidth consumption, power consumption, color, form, etc. . . . ), characteristics of the network part of the slice it is asked to be plugged in, as well as any other verifiable variable (temporal, location). When a transaction request is emitted, the peer(s) in charge of the next block will look into the ledger for content rules that may apply, verify if they are fulfilled, and in the positive case, will insert the request in a block (optionally for optimization reasons with a reference to a list of one or more intent rules applicable to the transaction request).

Content update validation (optional): represents the conditions under which a request that is correct from a content update part will be considered accepted by all participants (peers) of the network of the distributed ledger. In some example embodiments of the invention, satisfying the content update rule is necessary for the request to be accepted, but it is not sufficient. Some additional conditions on the participants may need to be reached before the request is accepted. This part is optional.

If a content update validation is not present, then, once the content update rule has been verified, any peer can emit a validation transaction including a reference to the initial transaction. This will be consolidated in the next block.

If a content update validation is present, then, once the content update rule has been verified by at least one peer and the transaction is added to the ledger, some participants need to emit new 'validation' transactions in order for the initial transaction to be considered accepted. When a transaction is added to the ledger, each peer will fetch the applying intent rules in the ledger and check whether the intent rules have some content update validation parts. If so, every peer can emit a validation transaction that accept or denies the initial transaction based on one or many content update validation parts. For instance, a content update validation part can be: "must be validated by at least 3 participants". As another example, a content update validation part may be "less than 2 participants do not agree to the initial transaction", or a combination of such affirmative and negative conditions (e.g. "must be agreed by at least 5 participants and rejected by not more than 4 participants"). If a transaction request is inserted into a block with such a content update validation part, each peer can: do nothing, or emit a validation transaction referring to the initial transaction or invalidating the initial transaction (remember: at this stage the content update is valid—the necessary part-, but not sufficient as some participant may decide that they don't agree for this instance). In our example, when three validation transactions validating the initial transaction will be included into a block, then the initial transaction is accepted. This acceptance will take the form of a new transaction stating this validation, including a reference to the initial transaction and the reference to every validation transaction that fulfills the content update validation rules of the initial transaction. This new transaction will be created by the next peer(s) chosen to create the new block.

Intent update validation (optional): represents the conditions under which parts of this rule can be changed (including this part). For example, this part describes how to reach an agreement to update the content update (e.g. change from "accept all devices from participants" to "accept only sensors"), the content update validation (e.g. changing from a majority vote to unanimity), or the intent update itself (e.g. change from "require unanimous vote to update the intent" to "require majority to update the intent").

The rules are not immutable and can be changed (as they are stored in the ledger, the old rule is not 'erased' but a new transaction represented the new form of the rule will supersede the ancient rule).

Hereinafter, an example according to some example embodiments of the invention is explained in detail. Here, peers representing the participant are described but the example is applicable to the participants, too.

Figure 2:
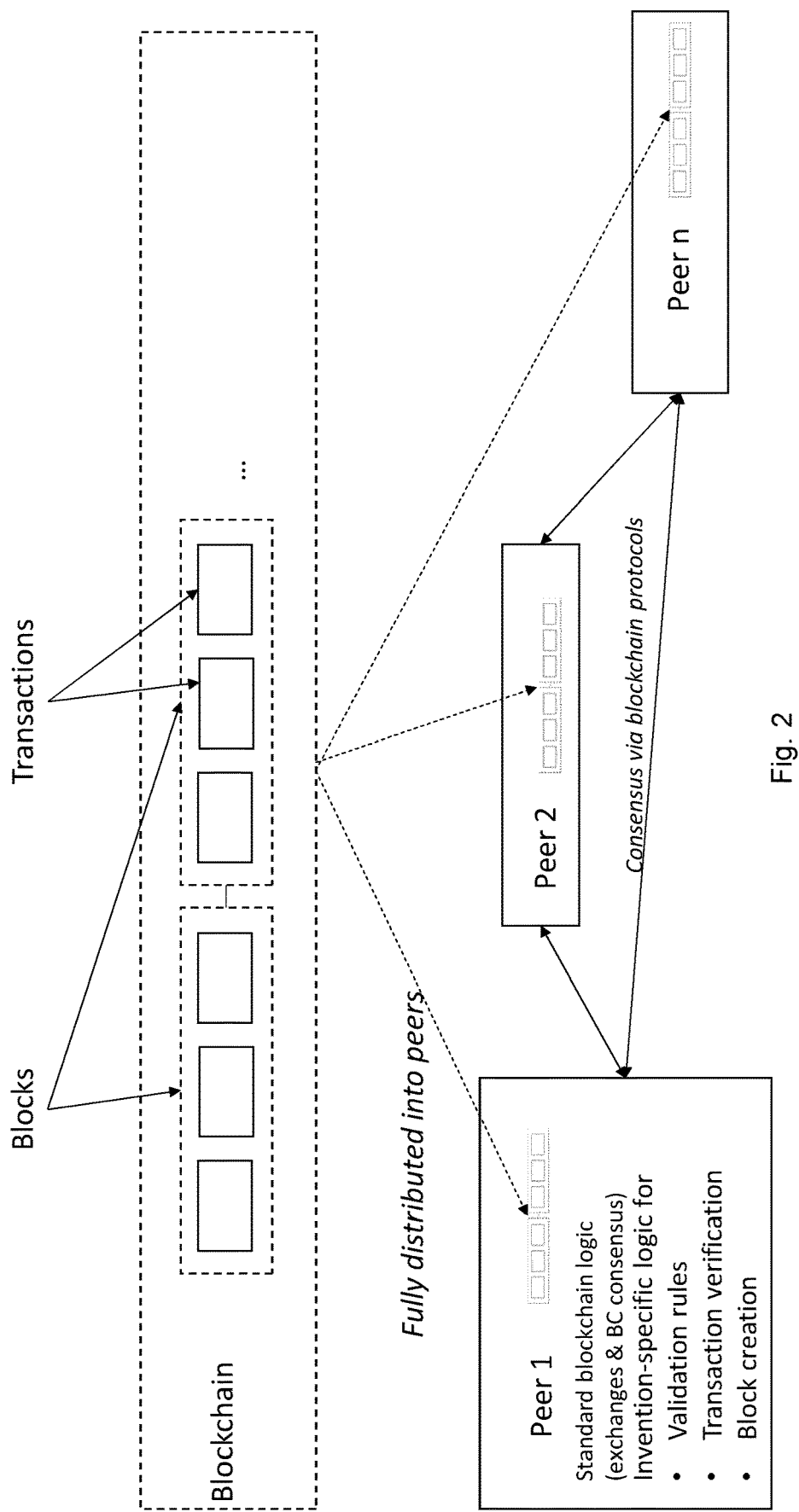
FIG. 2 shows the components of a distributed ledger according to some example embodiments of the invention.

A distributed ledger according to some example embodiments of the invention is shown in FIG. 2. FIG. 2 corresponds to FIG. 1. However, each peer of the distributed ledger comprises additionally an invention specific logic for validation rules, transaction verification, and block creation.

Message flows according to some example embodiments of the invention are shown in FIGS. 3, 4, 5 and 6. They show how to handle a request to add/remove a resource to the slice (set of shared resources; e.g. adding a device to a slice).

Figure 3:
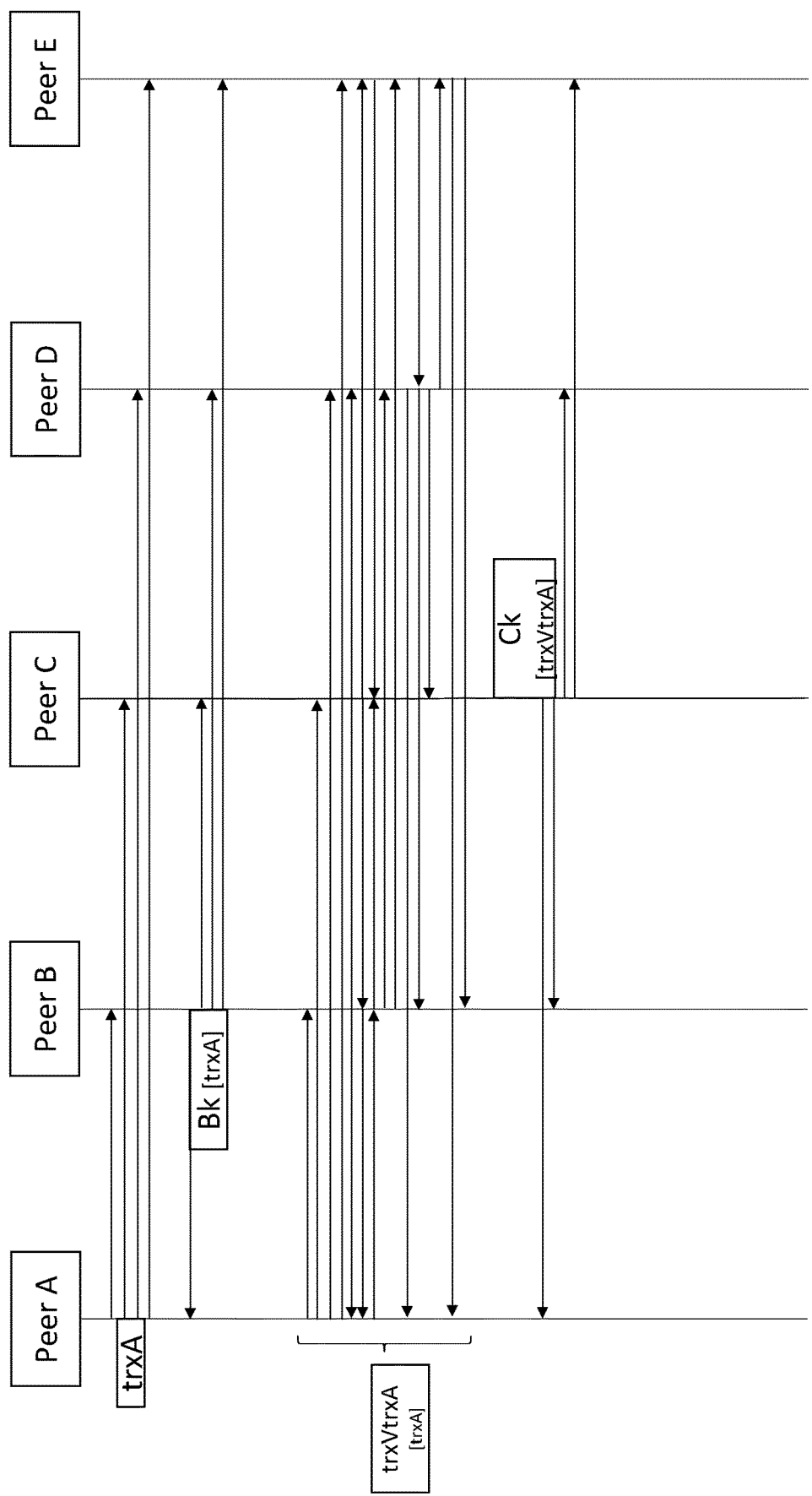
FIG. 3 shows a message flow according to some example embodiments of the invention.
Figure 4:
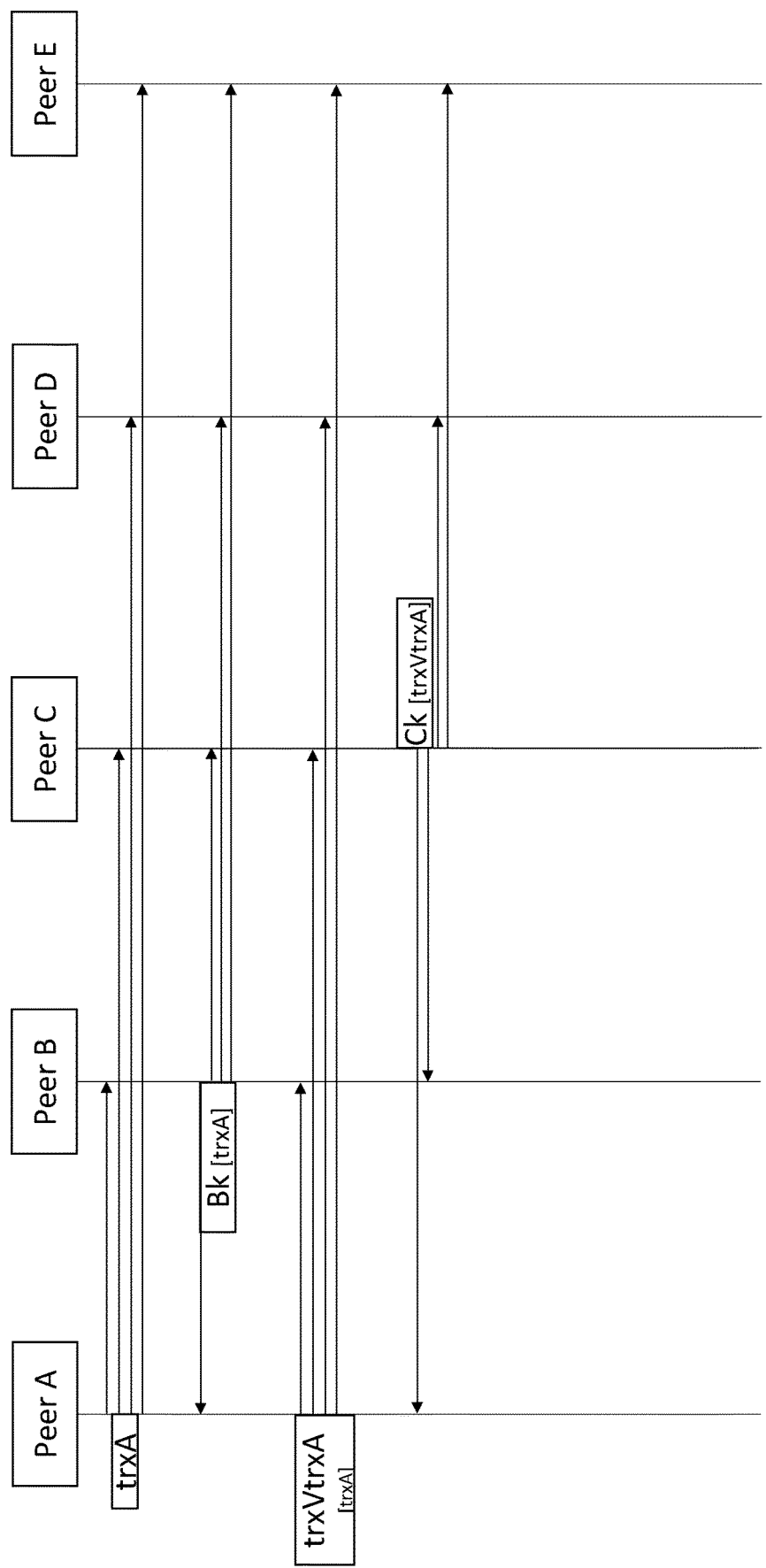
FIG. 4 shows a message flow according to some example embodiments of the invention.
Figure 5:
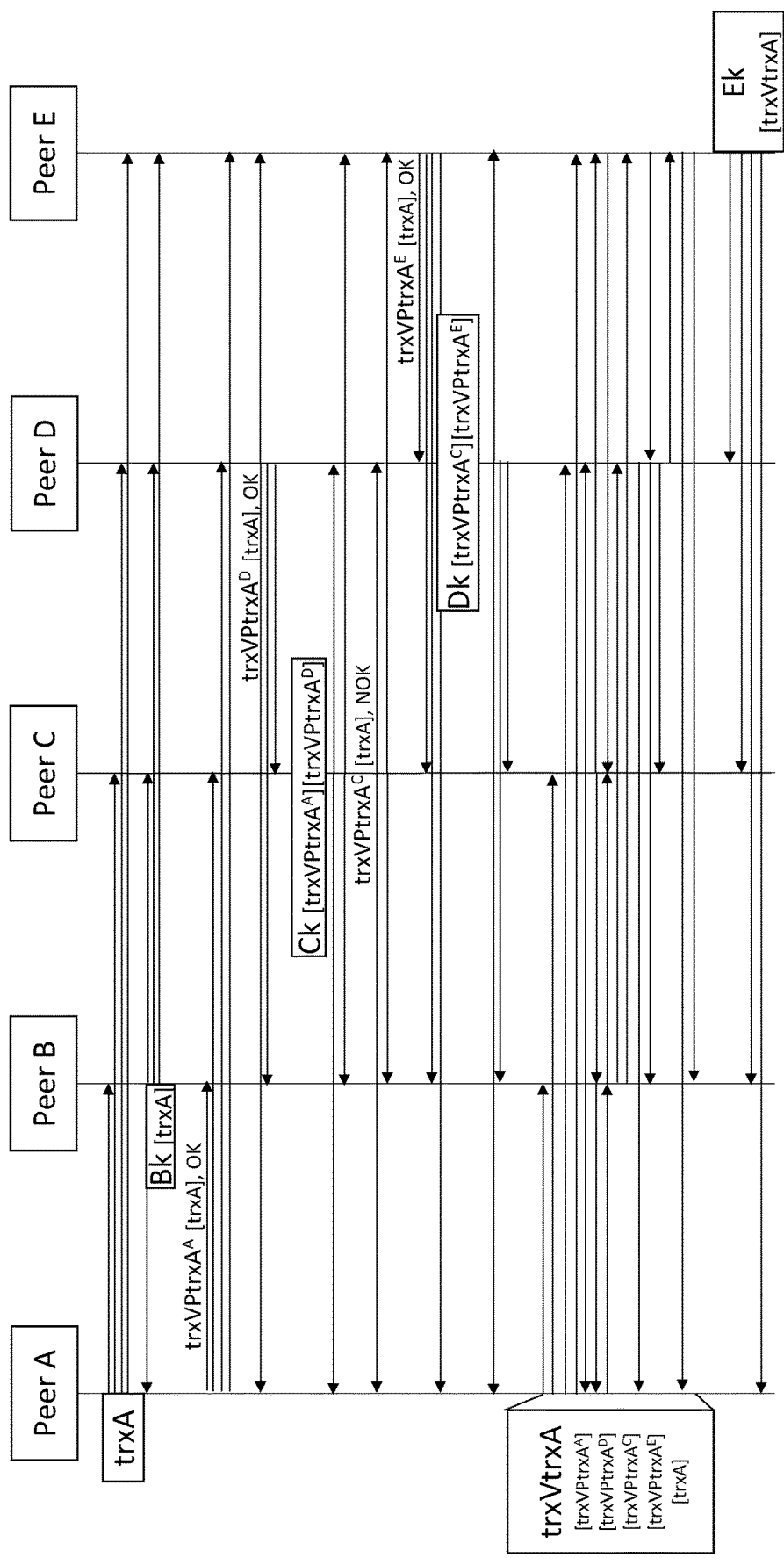
FIG. 5 shows a message flow according to some example embodiments of the invention.
Figure 6:
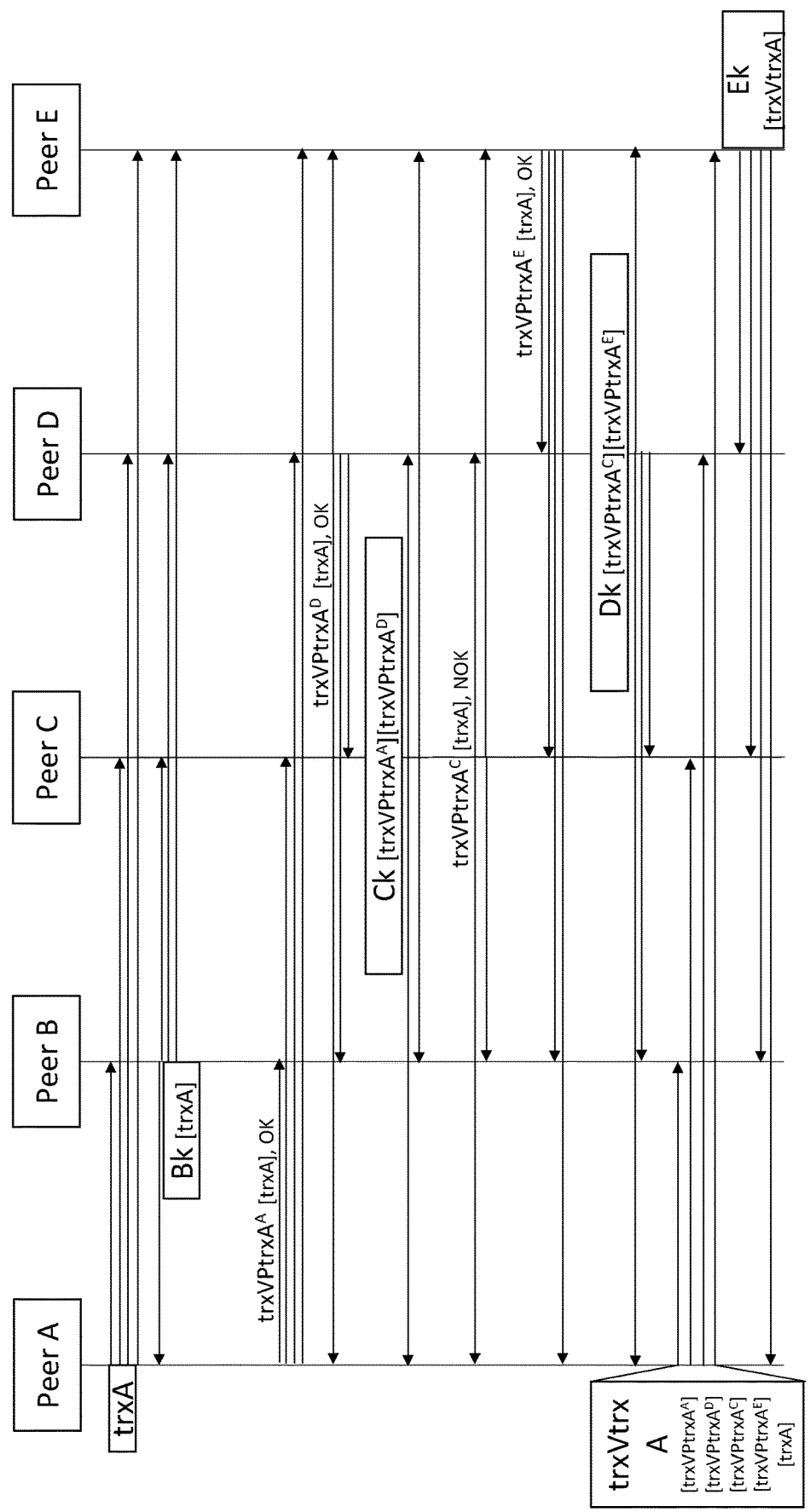
FIG. 6 shows a message flow according to some example embodiments of the invention.

FIGS. 3 and 4 show how to handle such a request when there is no content update validation rule. FIG. 4 comprises an optimization with respect to the number of transmitted messages. FIGS. 5 and 6 show how to handle such a request in presence of some content update validation rules. The message flow of FIG. 6 corresponds to that of FIG. 5 but comprises an optimization with respect to the number of transmitted messages, similar to FIG. 4.

Request to Add/Remove a Resource (e.g. a Device) to a Set of Shared Resources (e.g. a Slice):

A participant (peer) A would like to add/remove device a to the slice Sa:

Peer A creates a content update request transaction trxA for adding a device to the slice Sa (an example of an "initial transaction"). Let's assume that A respects all the protocols and security of the distributed ledger he uses—signatures, hash, HMAC, etc. A broadcasts its transaction into the network of the distributed ledger via the distributed ledger protocol such that other peers may receive the transaction. Depending on the distributed ledger, either one peer B is selected to produce the next block or there is a 'competition' between peers among which we will follow peer B:

Peer B parses the rules and selects the ones that apply to the content update request. Alternatively, B may apply all the rules to the request because the irrelevant rules are necessarily fulfilled by the request. B verifies that the content update parts of the rules are satisfied. If so, B inserts the transaction trxA in the next block Bk. Upon insertion, the other peers are generally notified by the distributed ledger protocol (i.e., they may receive the block Bk broadcasted into network of the distributed ledger). The messages described so far are common regardless of whether or not the embodiment foresees the potential presence of a content update validation part. Accordingly, they are shown in all the FIGS. 3 to 6.

If the embodiment foresees the potential presence of a content update validation part, upon reception of the block Bk, all peers retrieve the rules that apply to trxA and check if the rules have some content update validation part.

First, it is assumed that no validation rule is applicable (a relevant content update validation part is not present):
  a. If no such validation rule is applicable, any peer may emit a validation transaction (trxVtrxA) with a reference to trxA. Upon reception of one of these validation transactions, the peer(s) (e.g C) that create(s) the next block check(s) if (trxVtrxA) is valid (if the signature is correct, and that there is no validation rule that should have been applied) and inserts it in the block (Ck). C broadcasts its block Ck to the other peers. All the remaining trxVtrxA can be discarded. This is ending the request to add/remove a device. This message flow is shown in FIG. 3.
  b. Alternatively, as an optimization to avoid each peer to emit a validation transaction (trxVtrxA), one may delegate this responsibility to the first requester: A. Once A sees its own transaction trxA in a block, if there is no applicable content update validation rule, then A emit the validation transaction (trxVtrxA). This message flow is shown in FIG. 4.

Hereinafter, it is assumed that some content update validation rules are applicable. Message flows are shown in FIGS. 5 and 6:

Each peer i (or each relevant peer, if the transaction is relevant only for some of the peers) may create a validation part transaction trxVPtrxAi with references to trxA and the applicable content update validation rules that peer i chooses to validate, that expresses a part of the validation process for trxA, and broadcasts it into the network of the distributed ledger via the distributed ledger protocol such that the other peers may receive the transaction. Alternatively, each peer i could decide to create one trxVPtrxAi per applicable content update validation rule. For instance, if the rule contains the following content update validation part: {"must be validated by at least 3 participants" }, each peer i can create a validation part transaction (trxVPtrxAi) with a reference to trxA stipulating that the peer i agrees to trxA. Correspondingly, it may create a validation part transaction stipulating that the peer i does not agree to trxA, or not create any validation part transaction (e.g., if the transaction trxA is not relevant for the peer i).

The peer(s) (e.g. C, D . . . ) that create(s) the next blocks verify each of these transactions (if the peer has the required status or role for instance, if the signature is correct, etc) and insert them in a respective block (Ck, Dk, . . . ).

If the conditions of the content update validation part of all the rules that concern trxA are met by the collection of {trxVPtrxAi} that have been included into the blocks (Ck, Dk, . . . ), then any peer may create a global validation transaction (trxVtrxA) with a reference to trxA and a reference to the {trxVPtrxAi} that fulfills the conditions, and broadcast it into the network of the distributed ledger via the distributed ledger protocol such that the other peers may receive the block (see FIG. 5).

Alternatively, as an optimization to avoid each peer to emit a global validation transaction (trxVtrxA), one may delegate this responsibility to the first requester: A. Once A verifies that all the rules that concern trxA are met by the collection of {trxVPtrxAi} that have been included into blocks, only A creates the global validation transaction (trxVtrxA) (see FIG. 6).

Upon verification of the validity of (trxVtrxA), the peer(s) (e.g. E) that create(s) the next block insert(s) it in the next block and broadcast(s) the latter into the network of the distributed ledger via the distributed ledger protocol such that other peers may receive the next block, hence validating the change request trxA.

Optionally, each peer that must enforce some change in the content of the slice (i.e., the content update of the slice) may create an enforcement transaction (trxEtrxA) with a reference to trxA, stipulating that the configuration change of the slice (e.g. the addition/removal of the device) has been enforced. This is a way to store into the distributed ledger the application of the update at network level. Alternatively, the enforcement transaction (trxEtrxA) may be issued by another peer (in an auditor role), for instance when triggered by the peer having enforced locally the validated update. For example, a trusted peer in charge of managing and auditing/certifying the state of the infrastructure of the another peer. As a still further option, the peer may instruct a local enforcement entity to enforce the local portion of the initial transaction. It considers the local portion to be enforced upon confirmation from the local enforcement entity.

Request to Modify a Rule:

This request will follow the exact same protocol as previously described, with the exception that the rule parts to check for validation will be the Intent update validation parts.

The new version of the rule will be contained into the rule update request transaction trxA, the older rule will be deprecated, but will remain present untouched in the ledger. For performance issue, the peers may maintain in memory an up-to-date version of the rules base.

Request to Create a New Rule:

A new rule may be created by copying an existing rule, followed by necessary intent updates following the above protocols. A seed rule with an empty content update, no content update validation and an intent validation describing how to create a new rule may be inserted at the creation of the ledger, to allow for the creation of any kind of rule by copying and modifying it. For example, such a seed rule in a very permissive environment could state "to create a new rule, at least two positive votes are necessary"; in a more constrained environment it could go up to voters unanimity.

FIG. 7 shows an apparatus according to an example embodiment of the invention. The apparatus may be a participant of a slice, its peer, or an element thereof. FIG. 8 shows a method according to an example embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for retrieving 10, means for checking 20, means for creating 30, and means for broadcasting 40. The means for retrieving 10, means for checking 20, means for creating 30, and means for broadcasting 40 may be a retrieving means, checking means, creating means, and broadcasting means, respectively. The means for retrieving 10, means for checking 20, means for creating 30, and means for broadcasting 40 may be a retriever, checker, creator, and broadcaster, respectively. The means for retrieving 10, means for checking 20, means for creating 30, and means for broadcasting 40 may be a retrieving processor, checking processor, creating processor, and broadcasting processor, respectively.

The means for retrieving 10 retrieves update rules stored in a distributed ledger from the distributed ledger (S10). The means for retrieving may retrieve all update rules stored in the distributed ledger or all update rules stored in the distributed ledger and relevant for the initial transaction. The means for checking 20 checks whether or not a received initial transaction fulfills all the retrieved update rules (S20). The initial transaction requests to modify a content of a slice and/or an intent of the slice. If the initial transaction requests to modify the content of the slice, at least one of the update rules constrains the content of the slice or the modifying of the content of the slice. If the initial transaction requests to modify the intent of the slice, at least one of the update rules constrains the intent of the slice or the modifying of the intent of the slice.

If the initial transaction fulfills all the retrieved update rules (S20=yes), the means for creating 30 creates a block comprising the initial transaction (S30). The means for broadcasting 40 broadcasts the created block into a network of the distributed ledger (S40).

Figure 10:
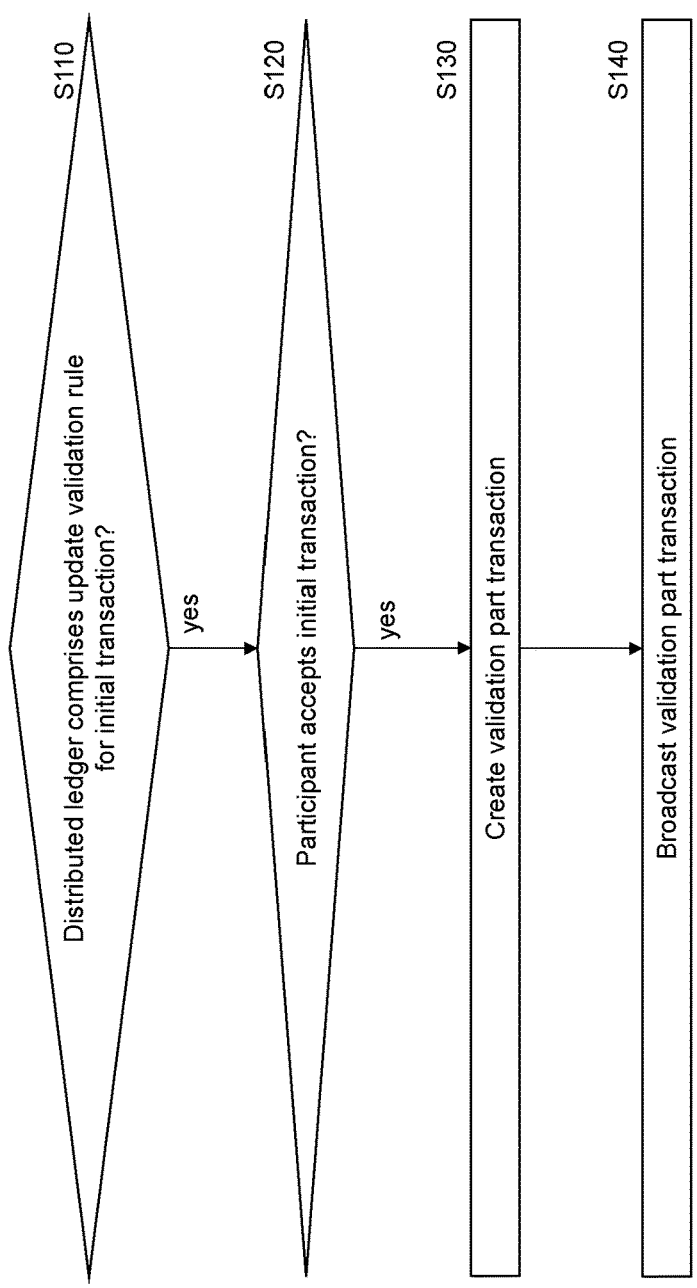
FIG. 10 shows a method according to an example embodiment of the invention.
Figure 9:
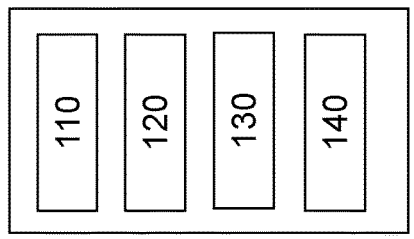
FIG. 9 shows an apparatus according to an example embodiment of the invention.

FIG. 9 shows an apparatus according to an example embodiment of the invention. The apparatus may be a participant of a slice, its peer, or an element thereof. FIG. 10 shows a method according to an example embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for retrieving 110, means for determining 120, means for creating 130, and means for broadcasting 140. The means for retrieving 110, means for determining 120, means for creating 130, and means for broadcasting 140 may be a retrieving means, determining means, creating means, and broadcasting means, respectively. The means for retrieving 110, means for determining 120, means for creating 130, and means for broadcasting 140 may be a retriever, determiner, creator, and broadcaster, respectively. The means for retrieving 110, means for determining 120, means for creating 130, and means for broadcasting 140 may be a retrieving processor, determining processor, creating processor, and broadcasting processor, respectively.

The means for checking 110 checks whether or not a distributed ledger comprises an update validation rule relevant for an initial transaction (S110). The initial transaction is comprised in a block received by a participant of the distributed ledger from a network of the distributed ledger. The initial transaction requests to modify a content and/or an intent of a slice. The update validation rule defines a condition for validating the initial transaction based on acceptance or non-acceptance of the initial transaction by at least one of the participants of the distributed ledger.

If the distributed ledger comprises the update validation rule (S110=yes), the means for determining 120 determines whether or not the participant accepts the initial transaction based on the update validation rule (S120).

If the distributed ledger comprises the update validation rule (S110=yes) and the participant accepts the initial transaction (S120=yes), the means for creating 130 creates a validation part transaction comprising the result of the determining (i.e., the determining of S120). In some example embodiments, the means for creating may not create any validation part transaction for some kind of initial transaction (e.g., initial transactions irrelevant for the participant). The means for broadcasting 140 broadcasts the validation part transaction into the network of the distributed ledger (S140).

In some example embodiments, not broadcasting the validation part transaction may be understood by the other participants as not accepting the initial transaction. In some of these example embodiments, the means for creating 130 may not create the validation part transaction and/or the means for broadcasting 140 may not broadcast the validation part transaction, if the result of the determining is negative.

In some example embodiments, the means for creating 130 may create the validation part transaction and the means for broadcasting 140 broadcasts the validation part transaction in any case, i.e., regardless of whether the determining (S120) is negative or affirmative. In this case, the content of the validation part transaction depends on the determining (S120).

Figure 12:
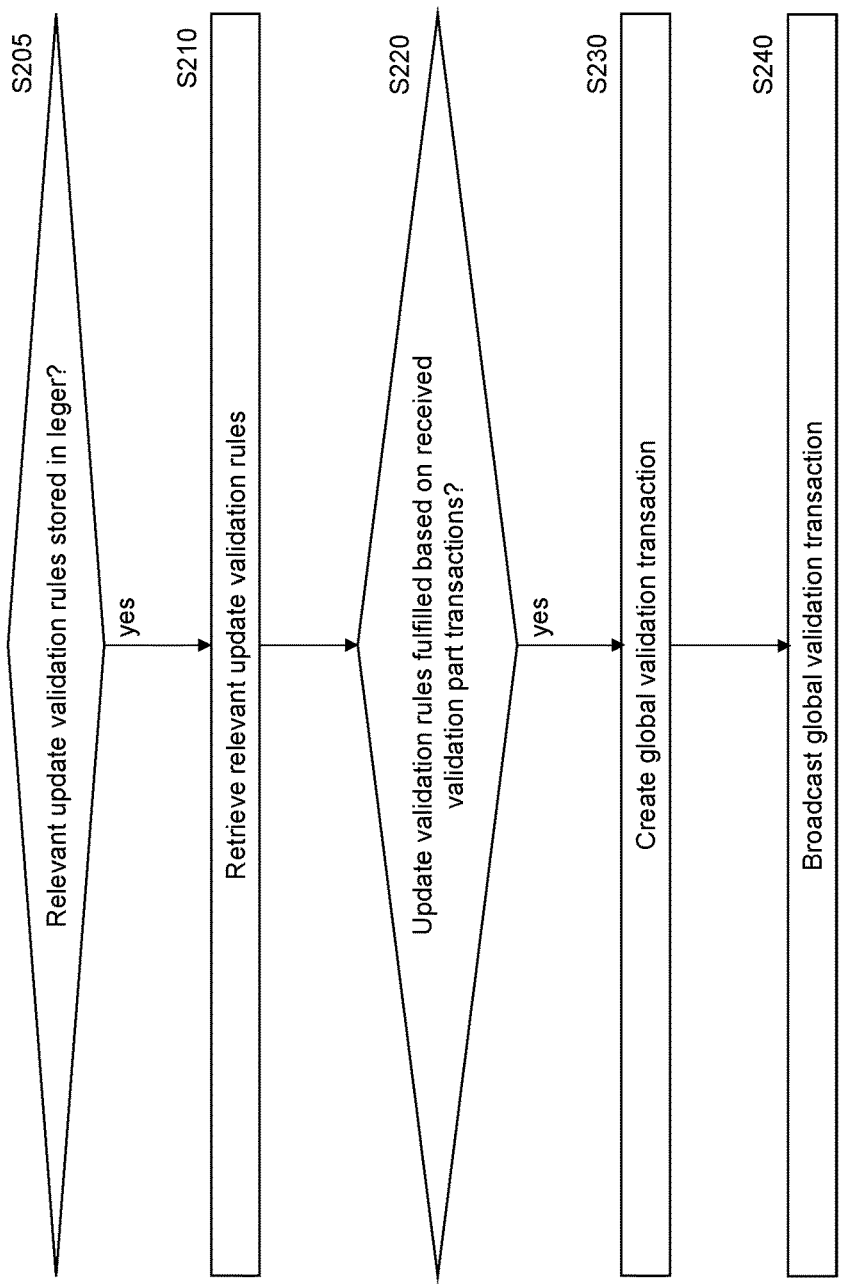
FIG. 12 shows a method according to an example embodiment of the invention.
Figure 11:
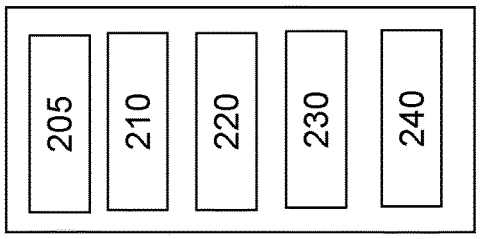
FIG. 11 shows an apparatus according to an example embodiment of the invention.

FIG. 11 shows an apparatus according to an example embodiment of the invention. The apparatus may be a participant of a slice, its peer, or an element thereof. FIG. 12 shows a method according to an example embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for checking 205, means for retrieving 210, means for determining 220, means for creating 230, and means for broadcasting 240. The means for checking 205, means for retrieving 210, means for determining 220, means for creating 230, and means for broadcasting 240 may be a checking means, retrieving means, determining means, creating means, and broadcasting means, respectively. The means for checking 205, means for retrieving 210, means for determining 220, means for creating 230, and means for broadcasting 240 may be a checker, retriever, determiner, creator, and broadcaster, respectively. The means for checking 205, means for retrieving 210, means for determining 220, means for creating 230, and means for broadcasting 240 may be a checking processor, retrieving processor, determining processor, creating processor, and broadcasting processor, respectively.

The means for checking 205 checks whether or not a distributed ledger comprises one or more update validation rules relevant for an initial transaction (S205). The initial transaction is comprised in a block received by a participant of the distributed ledger from a network of the distributed ledger.

The means for retrieving 210 retrieves the one or more relevant update validation rules stored in the distributed ledger (S210). Each of the update validation rule defines a respective condition for validating an initial transaction based on acceptance or non-acceptance of the initial transaction by at least one of the participants of the distributed ledger. Namely, each of the update validation rules defines at least one of the following conditions for validating the initial transaction:

not more than a respective first number of received validation part transactions indicates that the initial transaction is not accepted by a respective participant of the distributed ledger; or at least a respective second number of received validation part transactions indicates that the initial transaction is accepted by a respective participant of the distributed ledger.

The first number of a condition may be the same as the second number of the condition or different therefrom. One of the first number and the second number of a condition may be 0. The initial transaction requests to modify a content of a slice and/or an intent of the slice.

The means for determining 220 determines, based on one or more received validation part transactions, whether or not all the retrieved update validation rules are fulfilled for the initial transaction (S220). The validation part transactions are received in a block from a network of the distributed ledger.

If all the retrieved update validation rules are fulfilled for the initial transaction (S220=yes), the means for creating 230 creates a global validation transaction comprising the received validation part transactions (S230). The means for broadcasting 240 broadcasts the global validation transaction into the network of the distributed ledger (S240).

Figure 13:
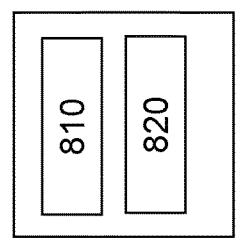
FIG. 13 shows an apparatus according to an example embodiment of the invention.

FIG. 13 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIG. 8, 10, or 12 and related description.

Some example embodiments of the invention may be applied to an arbitrary slice (set of resources). A set of resources may contain one or more physical objects, one or more virtual objects, one or more functions, one or more interfaces, etc., or a combination thereof. The set of resources may be shared by plural participants and comprise a content and/or an intent which may be modified by requests (transactions). A network slice, is an example of a slice (a set of resources). As another example, some example embodiments of the invention may be applied to (classical) network elements on which modules may be switched on and off by requests, and wherein plural participants are interested in whether or not the modules are switched on or off.

The participants of the sharing of the set of resources may or may not have a trusted relationship. The number of participants (peers) in a blockchain network is not limited in general.

Some example embodiments are explained with respect to a network slice in a 5G network. However, the invention is not limited to 5G. It may be used in 3G or 4G networks and 3GPP networks of future generations. It is not even limited to 3GPP networks. It may be used in other wireless or wired access networks (e.g. WiFi networks) and corresponding core networks. Some embodiments of the invention may be used even outside any communication networks in an environment where distributed ledgers (like blockchain) are employed.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a participant of a distributed ledger, in particular a network function in a slice or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus comprising:
one or more processors, and memory storing instructions that, when executed by the one or more processors, cause the apparatus to:
retrieve update rules stored in a distributed ledger from the distributed ledger;
check whether or not a received initial transaction fulfills all the retrieved update rules;
create a block comprising the initial transaction if the initial transaction fulfills all the retrieved update rules;
broadcast the block into a network of the distributed ledger, characterized in that
the initial transaction requests to modify an intent of a slice;
at least one of the update rules constrains the intent of the slice or the modifying of the intent of the slice;
the intent of the slice comprises the update rules or an update validation rule;
the update validation rule defines a condition for validating the initial transaction based on acceptance or non-acceptance of the initial transaction by at least one participant of the distributed ledger.

2. The apparatus according to claim 1, wherein the instructions, when executed by the one or more processors, further cause the apparatus to, for each update rule:
 decide whether or not the respective update rule is relevant for the initial transaction;
 inhibit the checking whether or not the initial transaction fulfills the respective update rule if the respective update rule is not relevant for the initial transaction.

3. The apparatus according to claim 1, wherein the content of the slice comprises resources making up the slice.

4. The apparatus according to claim 1, wherein the slice is a network slice.

5. The apparatus according to claim 1, wherein the instructions, when executed by the one or more processors, further cause the apparatus to:
 check if a validation transaction exists in a block for the initial transaction;
 enforce a local portion of the initial transaction or instruct a policy enforcement point to enforce the local portion of the initial transaction if the validation transaction exists in the block for the initial transaction;
create and broadcast an enforcement transaction if the validation transaction exists in the block for the initial update transaction and the local portion of the initial transaction is enforced; wherein
 the enforcement transaction indicates that the local portion of the initial transaction is enforced.

6. Apparatus comprising:
 one or more processors, and memory storing instructions that, when executed by the one or more processors, cause the apparatus to:
 check whether or not a distributed ledger comprises an update validation rule relevant for an initial transaction comprised in a block received by a participant of the distributed ledger from a network of the distributed ledger;
 determine whether or not the participant accepts the initial transaction if the distributed ledger comprises the update validation rule;
 create a validation part transaction comprising the result of the determining if the distributed ledger comprises the update validation rule and the participant accepts the initial transaction;
 broadcast the validation part transaction into the network of the distributed ledger, characterized in that
the initial transaction requests to modify an intent of a slice;
the intent of the slice comprises an update rule or the update validation rule;
the update rule defines a condition for updating the intent of the slice;
the update validation rule defines a condition for validating the initial transaction based on acceptance or non-acceptance of the initial transaction by at least one of the participants of the distributed ledger.

7. The apparatus according to claim 6, wherein
 the participant accepts or does not accept the initial transaction based on a condition not comprised in the distributed ledger.

8. The apparatus according to claim 6, wherein the instructions, when executed by the one or more processors, further cause the apparatus to, if the distributed ledger does not comprise the update validation rule:
 retrieve update rules stored in the distributed ledger from the distributed ledger;
 check whether or not the initial transaction comprised in the block fulfills all the retrieved update rules;
 create a validation transaction if the initial transaction fulfills all the retrieved update rules;
 broadcast the validation transaction into the network of the distributed ledger, wherein
 the validation transaction indicates that the initial transaction fulfills all the retrieved update rules.

9. The apparatus according to claim 6, wherein the instructions, when executed by the one or more processors, further cause the apparatus to, if the distributed ledger does not comprise the update validation rule:
 check if the apparatus issued the initial transaction;
 prohibit the broadcasting of the validation transaction if the apparatus did not issue the initial transaction.

10. The apparatus according to claim 6, wherein the content of the slice comprises resources making up the slice.

11. The apparatus according to claim 6, wherein the slice is a network slice.

12. The apparatus according to claim 6, wherein the instructions, when executed by the one or more processors, further cause the apparatus to:
 check if a validation transaction exists in a block for the initial transaction;
 enforce a local portion of the initial transaction or instruct a policy enforcement point to enforce the local portion of the initial transaction if the validation transaction exists in the block for the initial transaction;
 create and broadcast an enforcement transaction if the validation transaction exists in the block for the initial update transaction and the local portion of the initial transaction is enforced; wherein
 the enforcement transaction indicates that the local portion of the initial transaction is enforced.

13. Apparatus comprising:
 one or more processors, and memory storing instructions that, when executed by the one or more processors, cause the apparatus to:
 check whether or not a distributed ledger comprises one or more update validation rules relevant for an initial transaction comprised in a block received by a participant of the distributed ledger from a network of the distributed ledger;
 retrieve the one or more relevant update validation rules stored in the distributed ledger;
 determine, based on one or more validation part transactions referencing the initial transaction received in one or more blocks from the network of the distributed ledger, whether or not all the retrieved update validation rules are fulfilled for the initial transaction;
 create a global validation transaction comprising the received validation part transactions if all the retrieved update validation rules are fulfilled for the initial transaction;
 broadcast the global validation transaction into the network of the distributed ledger, characterized in that
the initial transaction requests to modify an intent of a slice;
each of the update validation rules defines at least one of the following conditions for validating the initial transaction:
 not more than a respective first number of received validation part transactions indicates that the initial transaction is not accepted by a respective participant of the distributed ledger; or
 at least a respective second number of received validation part transactions indicates that the initial transaction is accepted by a respective participant of the distributed ledger;
the intent of the slice comprises an update rule or the update validation rules;

the update rule defines a condition for updating the intent of the slice;

the update validation rules define a condition for validating the initial transaction based on acceptance or non-acceptance of the initial transaction by at least one of the participants of the distributed ledger.

14. The apparatus according to claim 13, wherein the instructions, when executed by the one or more processors, further cause the apparatus to:
   check if the apparatus issued the initial transaction;
   prohibit the broadcasting of the validation transaction if the apparatus did not issue the initial transaction.

15. The apparatus according to claim 13, wherein the content of the slice comprises resources making up the slice.

16. The apparatus according to claim 13, wherein the slice is a network slice.

17. The apparatus according to claim 13, wherein the instructions, when executed by the one or more processors, further cause the apparatus to:
   check if a validation transaction exists in a block for the initial transaction;
   enforce a local portion of the initial transaction or instruct a policy enforcement point to enforce the local portion of the initial transaction if the validation transaction exists in the block for the initial transaction;
   create and broadcast an enforcement transaction if the validation transaction exists in the block for the initial update transaction and the local portion of the initial transaction is enforced; wherein
   the enforcement transaction indicates that the local portion of the initial transaction is enforced.

\* \* \* \* \*